United States Patent
Petry

(10) Patent No.: US 6,902,237 B2
(45) Date of Patent: Jun. 7, 2005

(54) ADJUSTER FOR A VEHICLE SEAT

(75) Inventor: Markus Petry, Bobenheim-Roxheim (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 0 days.

(21) Appl. No.: 10/646,567

(22) Filed: Aug. 22, 2003

(65) Prior Publication Data
US 2004/0066077 A1 Apr. 8, 2004

Related U.S. Application Data

(63) Continuation of application No. PCT/EP02/12926, filed on Nov. 19, 2002.

(30) Foreign Application Priority Data
Nov. 22, 2001 (DE) .......................... 101 57 211

(51) Int. Cl.[7] .............................................. A47C 1/02
(52) U.S. Cl. .................... 297/344.15; 297/340
(58) Field of Search .................. 297/316, 317, 297/318, 340, 322, 344.12, 344.14, 344.15, 344.11, 378.11, 378.12; 248/160, 424

(56) References Cited

U.S. PATENT DOCUMENTS

| | | | |
|---|---|---|---|
| 3,736,026 A | 5/1973 | Ziegler et al. | |
| 4,103,967 A | 8/1978 | Tanaka et al. | |
| 4,252,369 A | * 2/1981 | Kluting | 297/378.12 |
| 4,268,086 A | 5/1981 | Okuyama | |
| 4,487,390 A | 12/1984 | Miyashita | |
| 4,629,252 A | * 12/1986 | Myers et al. | 297/366 |
| 5,052,748 A | 10/1991 | Fourrey et al. | |
| 5,248,178 A | 9/1993 | Brambilla | |
| 5,265,937 A | 11/1993 | Allen | |
| 5,383,699 A | 1/1995 | Woziekonski et al. | |
| 5,476,307 A | 12/1995 | Whalen | |
| 5,611,600 A | * 3/1997 | Busch et al. | 297/378.12 |
| 5,676,424 A | 10/1997 | Winkelhake | |
| 5,725,279 A | 3/1998 | Ward et al. | |
| 5,733,005 A | * 3/1998 | Aufrere et al. | 297/340 |
| 5,904,403 A | * 5/1999 | Unckrich | 297/378.12 |
| 5,938,286 A | 8/1999 | Jones et al. | |
| 5,979,985 A | * 11/1999 | Bauer et al. | 297/340 |
| 6,000,742 A | 12/1999 | Schaefer et al. | |
| 6,209,955 B1 | 4/2001 | Seibold | |
| 6,540,232 B2 | 4/2003 | Hänsel et al. | |
| 6,598,938 B2 | 7/2003 | Boltze et al. | |
| 6,629,710 B1 | 10/2003 | Shafry et al. | |
| 6,659,557 B2 | 12/2003 | Deptolla | |

FOREIGN PATENT DOCUMENTS

| | | |
|---|---|---|
| DE | 620809 | 10/1935 |
| DE | 33 09 253 A1 | 9/1983 |
| DE | 33 40 393 A1 | 5/1984 |
| DE | 38 20 986 A1 | 1/1989 |
| DE | 38 28 659 A1 | 3/1989 |

(Continued)

OTHER PUBLICATIONS

U.S. Appl. No. 10/646,566, filed Aug. 22, 2003; In re: Christoffel et al.; entitled *Fitting for a Vehicle Seat*.

Primary Examiner—Peter M. Cuomo
Assistant Examiner—Stephen Vu
(74) Attorney, Agent, or Firm—Womble Carlyle Sandridge & Rice, PLLC

(57) ABSTRACT

In an adjuster (101) for a vehicle seat, particularly an automobile seat, having a first adjuster part (105) and a second adjuster part (108) which are pivotable relative to one another, thus allowing the vehicle seat to pivot between at least one use position and one non-use position, a pawl (115) pivotably borne on the first adjuster part (105) interacts with at least one single locking element (118, 132) of the second adjuster part (108) to lock the adjuster (101), wherein the pawl (115) locks the adjuster (101) in the use position as well as in the non-use position.

24 Claims, 4 Drawing Sheets

FOREIGN PATENT DOCUMENTS

| | | |
|---|---|---|
| DE | 44 29 405 A1 | 2/1996 |
| DE | 195 23 609 A1 | 1/1997 |
| DE | 196 48 974 A1 | 5/1997 |
| DE | 198 50 751 C1 | 5/2000 |
| DE | 199 49 759 C1 | 10/2000 |
| DE | 100 34 430 A1 | 1/2002 |
| EP | 0 516 593 A1 | 12/1992 |
| EP | 1 068 985 A1 | 1/2001 |
| GB | 2 129 678 A | 5/1984 |
| WO | WO 96/20848 | 7/1996 |
| WO | WO 03/004306 A1 | 1/2003 |

\* cited by examiner

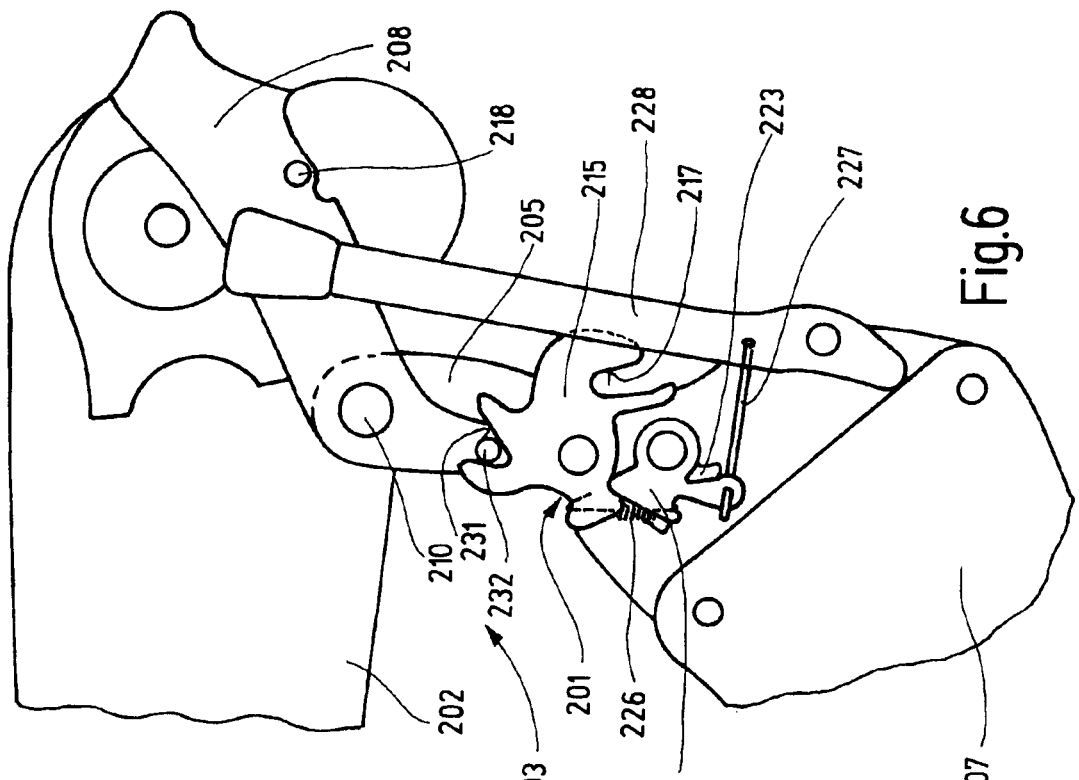
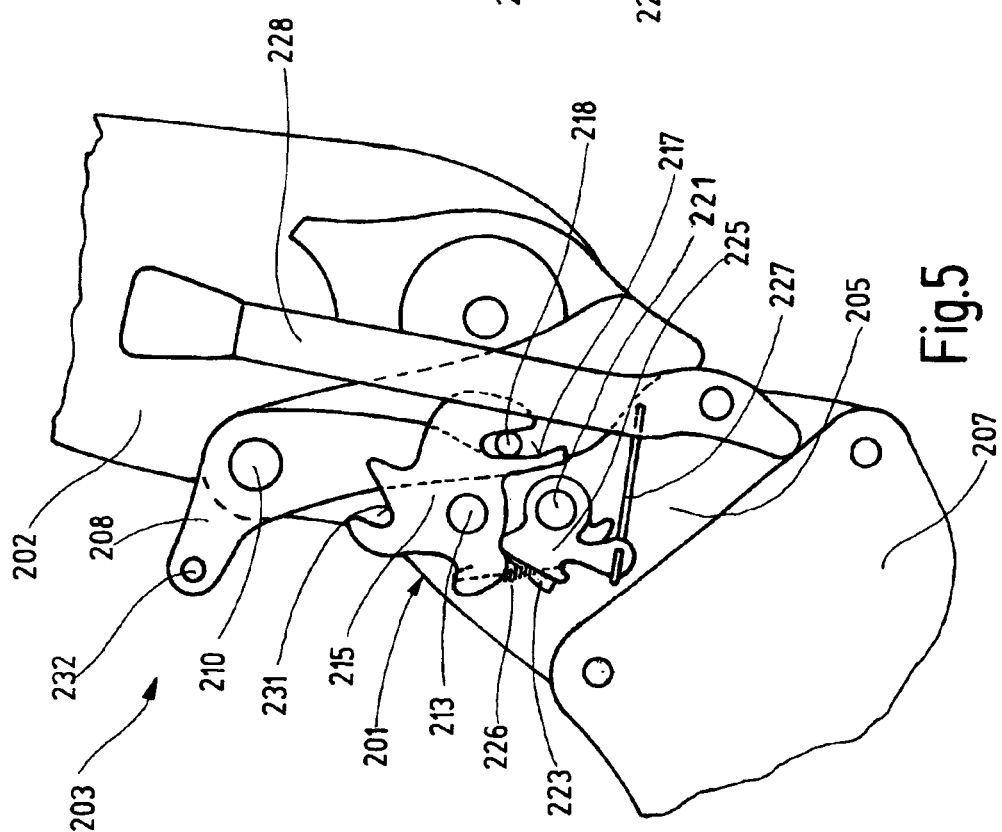

US 6,902,237 B2

ADJUSTER FOR A VEHICLE SEAT

CROSS-REFERENCE TO RELATED APPLICATION

This application is a continuation of International Application No. PCT/EP02/12926, which was filed Nov. 19, 2002, and is entirely incorporated herein by reference.

BACKGROUND OF THE INVENTION

The present invention pertains to an adjuster for a vehicle seat, in particular for a motor vehicle seat, having a first adjuster part and a second adjuster part which are pivotable relative to one another and by way of which the vehicle seat can be pivoted between at least one use position and at least one non-use position.

In a known adjuster of this type, used for adjusting the height or passing into a level floor position, the use position and non-use position are secured by locking devices. In practice, desires remain, for example with respect to the number of components and therefore production costs.

BRIEF SUMMARY OF THE INVENTION

The present invention is based on the object of improving an adjuster, such as an adjuster of the type mentioned above. In accordance with one aspect of the present invention, an adjuster for a vehicle seat, in particular for a motor vehicle seat, has a first adjuster part and a second adjuster part which are pivotable relative to one another and by way of which at least part of the vehicle seat can be pivoted between at least one use position and at least one non-use position, wherein a pawl pivotably borne on the first adjuster part interacts with at least one single locking element of the second adjuster part to lock the adjuster, and the pawl locks the adjuster both in the use position and in the non-use position.

By virtue of the fact that a pawl is pivotably borne on the first adjuster part and interacts with at least one single locking element of the second adjuster part, in order to lock the adjuster, a simple locking device is provided. By virtue of the fact that the pawl locks the adjuster both in the use and non-use position, one single locking device can be used for the adjuster. In this way, the number of components and, consequently, the production costs, are reduced. These advantages become even clearer when the pawl falls into the same locking position both in the use position and the non-use position, and is preferably also secured by the same securing elements and/or unlocked by the same activation element, this feature also simplifying and improving operation.

The terms "use position" and "non-use position" refer to the possibility of a user sitting down on the seat. This does not exclude the option of placing a load on the forward pivoted backrest of the vehicle seat in the non-use position. The adjuster can be used in all vehicle seats that are pivotable in their entirety or whose backrests can be pivoted into specific positions, e.g. the entire vehicle seat into a level floor position or package position, or the backrest into a forward pivoted table position, a backward inclined or level pivoted lying position or a forward pivoted, swung-free position. There can also be multiple adjusters according to the invention in the vehicle seat, serving different purposes.

Preferably, there are a corresponding number of locking elements for the different possible positions of the vehicle seat, such as bolts, each interacting with the same pawl, the latter preferably having one or several mouths depending on the arrangement and geometry of the components. The mouths then clutch at least one of the locking elements. Preferably, the mouths, with reference to the pivoting movement of the pawl, are open in the same direction. The mouths are preferably arranged on different sides of the pawl so as to simplify the movements of the components. The mouths can also be replaced by hooks, tongues, or similar elements. The locking elements have been conceived as single elements and not as separate parts of a long-stretched toothed element or similar element. Preferably, the locking elements can move the pawl into its locking position, this feature reducing the number of mutual spring loads and thus simplifying production.

Securing elements can be installed for securing the locking position of the pawl and for compensating for tolerances, the same securing elements being preferably active in all locking positions of the pawl, i.e. independent of the position of the vehicle seat and therefore for all locking options of the adjuster.

BRIEF DESCRIPTION OF THE DRAWINGS

The invention is explained in greater detail below by way of two exemplary embodiments illustrated in the drawing, in which:

FIG. 5 is a schematic view of the second exemplary embodiment in a use position of the vehicle seat, and FIG. 6 is an illustration analogous to FIG. 5 in a non-use position in which the backrest is in a table position.

DETAILED DESCRIPTION OF THE INVENTION

Figure 1:
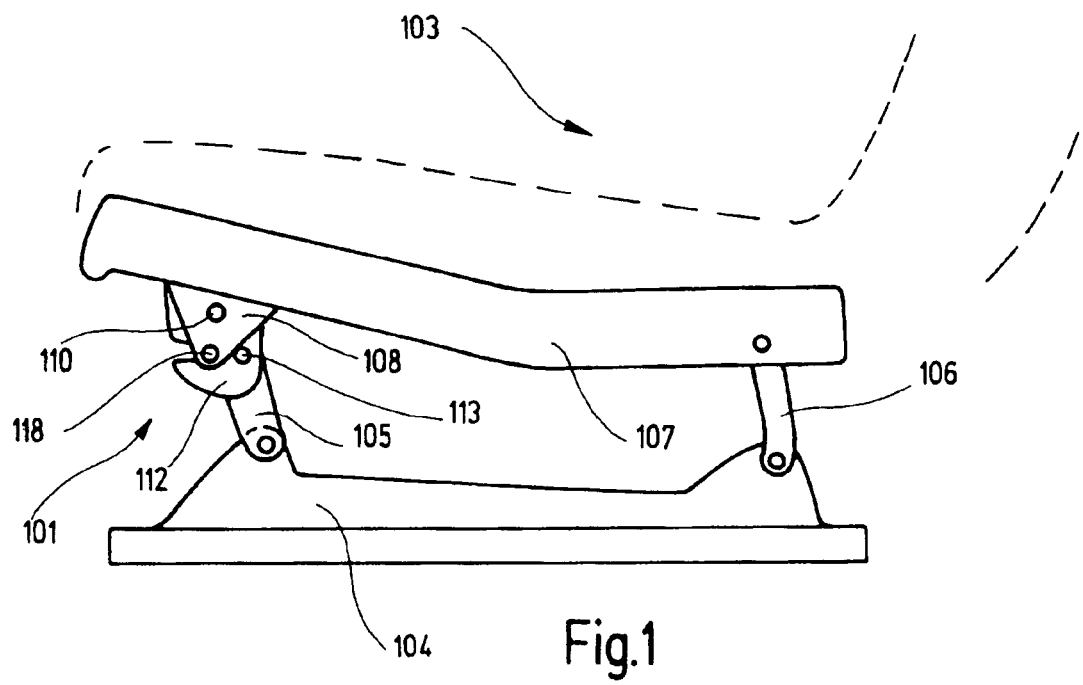
FIG. 1 is a schematic view of the first exemplary embodiment in a use position of the vehicle seat, with the vehicle seat partially illustrated by broken lines.
Figure 2:
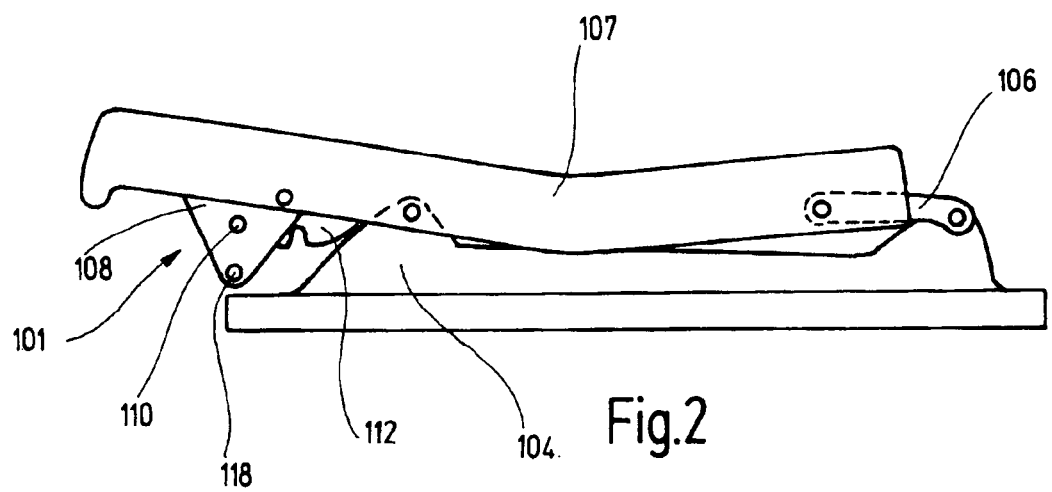
FIG. 2 is an illustration analogous to FIG. 1 in a non-use position of the vehicle seat.

In the first exemplary embodiment, an adjuster 101 is provided as a seat support of a vehicle seat 103 in a rear seat row of a motor vehicle, for example a van. The adjuster 101 has, with respect to the direction of travel, on each side of the vehicle seat 103, a foot area 104 connected with the vehicle frame, and a front leg 105 pivotably mounted in the front of the foot area 104, as a first adjuster part. The adjuster 101 further includes, with respect to the direction of travel, on each side of the vehicle seat 103, a rear leg 106 pivotably mounted in the rear of the foot area 104, a link 107, pivotably mounted with its rear end on the rear leg 106, and an adaption part 108 fixedly attached to the front end of the link 107 and pointing downward, as a second adjuster part which is pivotably mounted on the front leg 105 by way of an adjuster bolt 110. The two links 107 are connected with one another to form a seat frame bearing the seat pan receiving the seat upholstery.

The vehicle seat 103 can be switched between a use position, suitable for a user sitting in the vehicle seat and mainly characterized by upright legs 105 and 106, and a flat floor position as the non-use position and characterized by a maximum approach of the link 107 to the foot area 104.

A cover sheet 112 fixedly connected to the front leg 105 is arranged between the adaption part 108 and the front leg 105 in such a way as to form an at least partially closed mounting space. A pawl 115 is pivotably borne on a bearing bolt of the front leg 105 that is parallel to an adjuster bolt 110, and shall hereinafter be called pawl bearing bolt 113, and is arranged obliquely behind and below the latter in the use position. In the use position of the vehicle seat 103, the pawl 115 clutches from above, with its first hooked mouth 117, a first locking bolt 118 that protrudes parallel to the adjuster bolt 110 from the lower end of the adaption part 108, reaches through a mouth-shaped cut-out in the cover sheet 112 and the front leg 105 and is arranged below the adjuster bolt 110 when in use position.

A clamping cam 123 and a catching element 125 are pivotably borne on the adjuster bolt 110 between the front leg 105 and the cover sheet 112. In the use position of the vehicle seat 103, the clamping cam 123 being spring loaded against the pawl 115 secures the pawl 115 in the described locking position. The catching element 125 is pretensioned towards the pawl 115 by way of an active pull spring 126. The catching element 125 is normally arranged at a slight distance from the pawl 115. The catching element 125 supports the pawl 115 in the event of a crash so as to keep the pawl from opening. A Bowden cable 127 is attached to a carry-along bolt 129 of the catching element 125 as an activation element. The carry-along bolt 129 also serves to attach the pull spring 126. When unlocking, once a certain pivoting angle of the catching element 125 is exceeded, the catching element 125 carries the clamping cam 123 along by way of a finger or a protruding area of the latter, thus releasing the pawl 115.

On the side which, when the pawl 15 is opened, moves ahead, i.e. on the side facing away from the first hooked mouth 117, the pawl 115 has a second hooked mouth 131. The adaption part 108 has a second locking bolt 132 protruding through a slide-shaped cut-out in the cover sheet 112, in the area which is located behind the adjuster bolt 110 in the direction of travel.

To switch from the use position to the floor position, the catching element 125 and the clamping cam 123 in both fittings 101 are pivoted back by means of the Bowden cables 127, and the pawl 115 is pivoted clockwise with reference to the figure. Thus the pawl 115 releases the first locking bolt 118.

The adjuster 101 conceived as a quadruple joint can now be flatly pivoted, with the front leg 105 pivoting forward counter-clockwise with reference to the figure, and the first locking bolt 118 of the adaption part 108 thus moving away from the pawl 115, and the pawl 115 approaches the second locking bolt 132 at the same time. In an intermediate position that is not illustrated in the figures, the second locking bolt 132 comes to bear against the pawl 115, presses it, during another pivoting movement of the adjuster 101, in the direction of its original, locking position, in a counter-clockwise direction with reference to the figure. The second locking bolt 132 eventually moves into the second hooked mouth 131, thereby locking the adjuster 101 again.

Figure 3:
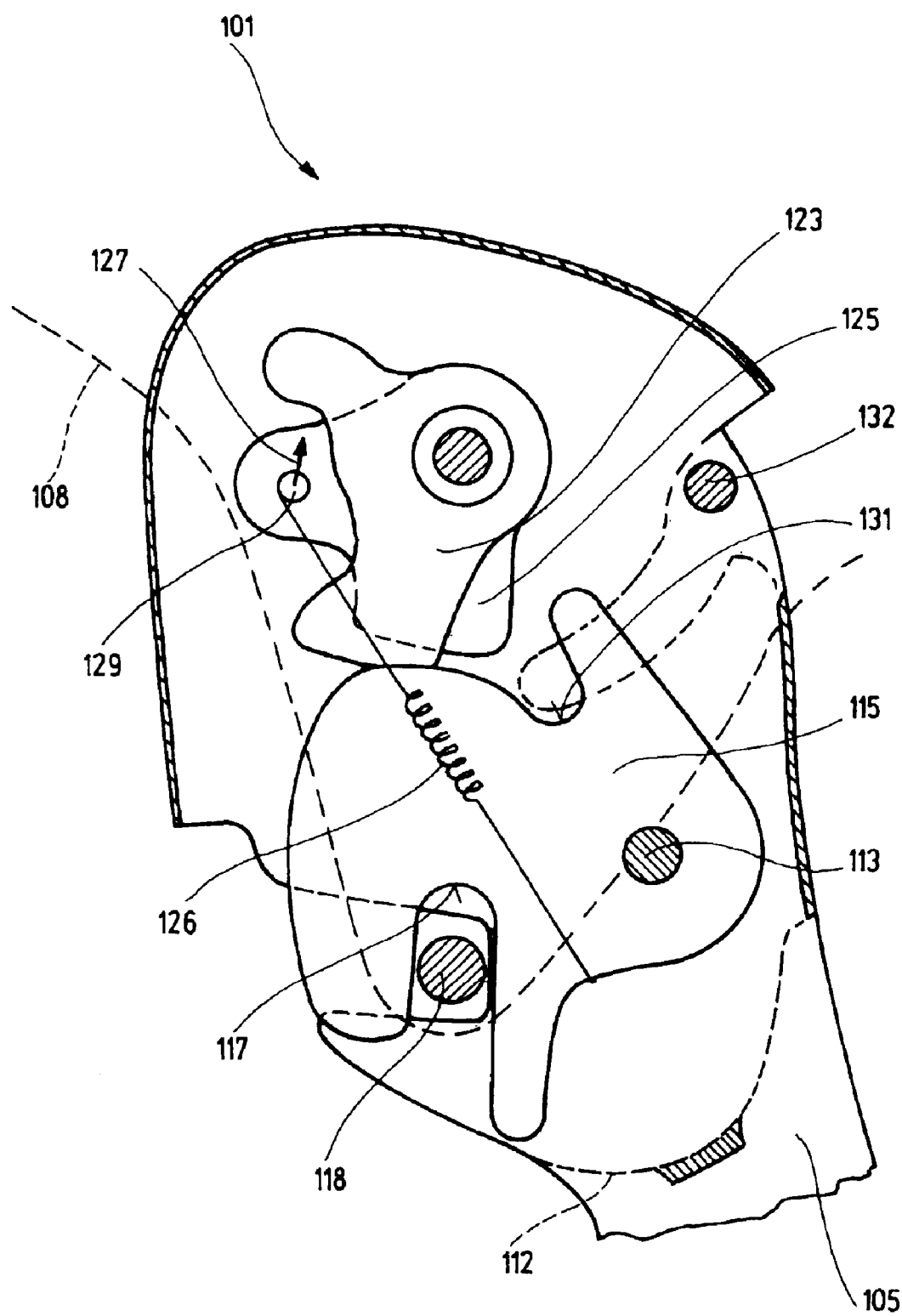
FIG. 3 is a partially sectional, partial view of the first exemplary embodiment analogous to FIG. 1.
Figure 4:
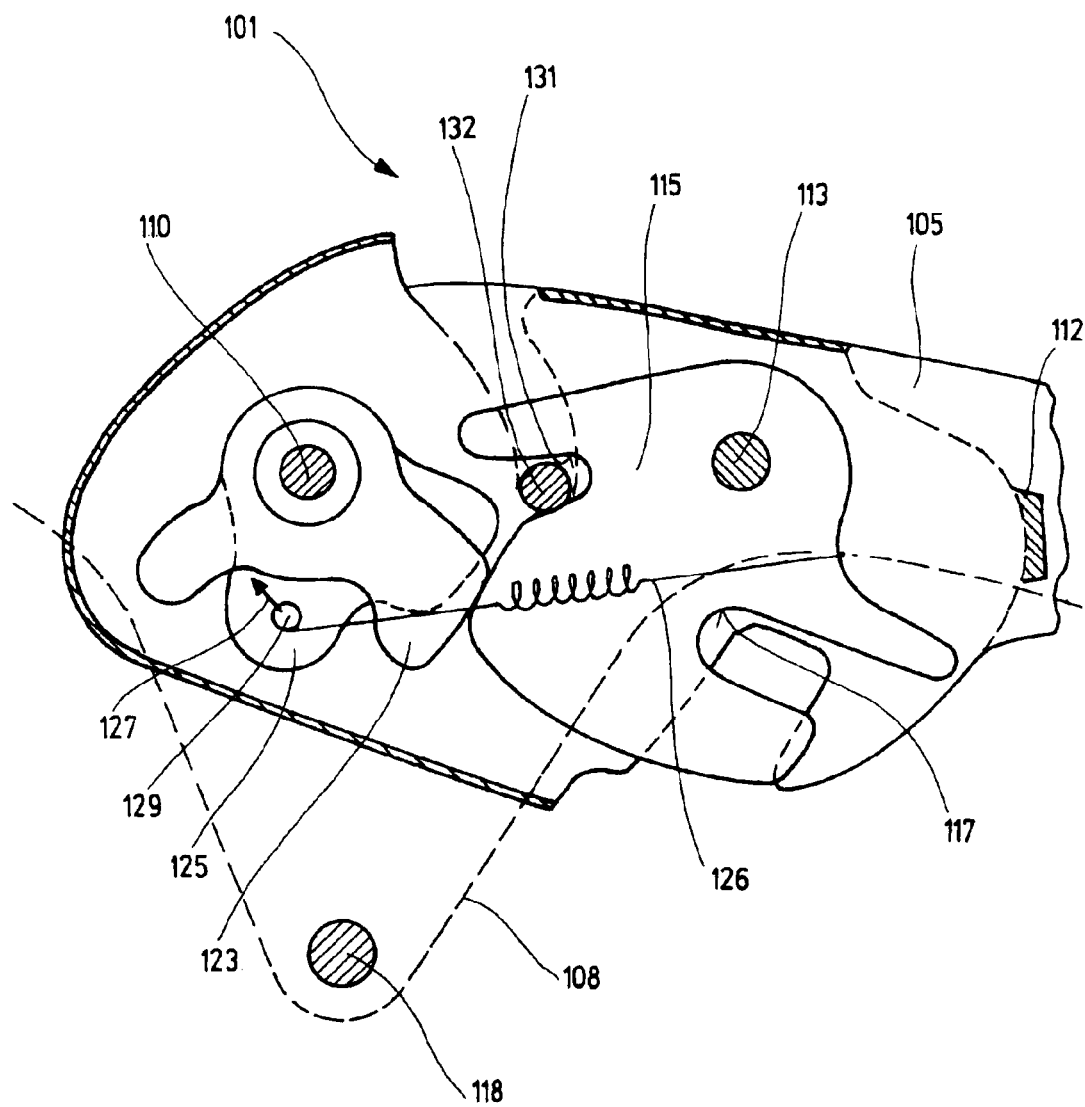
FIG. 4 is a partially sectional, partial view of the first exemplary embodiment analogous to FIG. 2.

A shown in FIG. 4, the pawl 115, in the non-use position of the vehicle seat 103, takes a locking position again, identical, with reference to the front leg 105, to the locking position represented in FIG. 3 for the use position, the pawl thus having identical functions. In particular, the pawl 115 is secured again by means of the clamping cam 123 and the catching element 125 as securing elements. The geometry chosen, i.e. the dimensions and radii of the second hooked mouth 131 and the distances to the pivoting axles, ensure that the pawl 115 is not opened, in the pivoted position, by a momentum of the securing elements.

The return to the use position is initiated again by activating the Bowden cables 127 which unlock the adjuster 101 in the manner described above. When pivoting the adjuster 101 from the position in FIG. 4 to the position in FIG. 3, first the pawl 115, released from the safety elements 123 and 125, is opened via the second locking bolt 132, and then the second locking bolt 132 is released from the pawl 115. As soon as the first locking bolt 118 comes to bear against a protruding rim area of the first mouth 117, it presses the pawl 115 in a counter-clockwise direction with reference to the figure, so that the pawl, once the use position has been restored, resumes its locking position again in which the first hooked mouth 117 clutches the locking bolt 118, and in which the pawl 115 is secured by the securing elements 123 and 125.

The second exemplary embodiment is mostly similar to the first exemplary embodiment, for which reason the reference signs for identical components or components having similar functions differ by 100. The adjuster 201 is conceived as a table-folding fitting of a backrest 202 of a vehicle seat 203 on both sides of the same. A frame bearing sheet 205 defining a first adjuster part is fixedly attached to the seat frame 207. As before, the seat frame 207 bears the seat cushion, which is not illustrated, in a seat pan. A backrest bearing sheet 208 defining a second adjuster part and movably mounted on the frame bearing sheet 205 by way of an adjuster bolt 210, is fixedly attached to the structure of the backrest 202.

The backrest 202 is pivotable, by way of the adjuster 201, between an upright use position of the vehicle seat 203, suitable for sitting, wherein an additional inclination position can be achieved by means of a backrest fitting that is only hinted at in the figure, and a flat table position as a non-use position of the vehicle seat 203, suitable for loading.

A pawl 215 is pivotably borne on a bearing bolt of the frame bearing sheet 205 arranged parallel to and below the adjuster bolt 210, hereinafter called pawl bearing bolt 213. In the use position, the pawl 215, with its first hooked mouth 217, clutches a first locking bolt 218 from above, which protrudes parallel to the adjuster bolt 210 from the backrest bearing sheet 208 and being arranged below the adjuster bolt 210 when in use position.

Below the pawl bearing bolt 213 and parallel to it, a bearing bolt, hereinafter called cam bearing bolt 221, protrudes from the frame bearing sheet 205. A clamping cam 223 and a catching element 225 are pivotably borne on the cam bearing bolt 221. In the use position, the clamping cam 223 which, being spring-loaded, bears against the pawl 215, secures the pawl 215 in the described locking position. The catching element 225 is pre-tensioned towards the pawl 215 by way of an active pull spring 226. The catching element 225 is normally arranged at a slight distance from the pawl 215. The catching element 225 supports the pawl 215 in the event of a crash so as to keep the pawl from opening.

By way of a Bowden cable 227, an activation lever 228 serving as an activation element, which is pivotably borne on the frame bearing sheet 205, interacts with an arm of the catching element 225. When unlocking, the catching element 225, once a certain pivoting angle is exceeded, carries the clamping cam 223 along to release the pawl 215. There may be a single activation lever 228 unlocking the adjusters 201 on both sides via a shaft, or each adjuster 201 has its own activation lever 228.

On the side which, when the pawl 215 is opened, moves ahead from the described, locking position, i.e. on the side facing away from the first hooked mouth 217, the pawl 215 has a second hooked mouth 231. The backrest bearing sheet 208 has a second locking bolt 232 in the area which is located in front of the adjuster bolt 210 in the direction of travel. To switch from the use position to the table position, the catching element 225 and the clamping cam 223 in both adjusters 201 are pivoted back by way of the activation lever 228, and the pawl 215 is pivoted counter-clockwise with reference to the figure. Thus the pawl 215 releases the first locking bolt 218.

Now, the backrest 202 can be pivoted around the adjuster bolt 210 towards the front, i.e. the adjuster 201 pivots counter-clockwise with reference to the figure. Thus the first locking bolt 218 moves away from the pawl 215 and, at the same time, the second locking bolt 232 approaches the pawl 215. In an intermediate position, which is not illustrated, the second locking bolt 232 comes to bear against a protruding rim area of the second hooked mouth 231 of the pawl 215, pressing it with another pivoting movement of the adjuster 201 in the direction of its original, locking position, i.e. clockwise with reference to the figure. The second locking bolt 232 eventually reaches into the second hooked mouth 231, thereby locking the adjuster 201 again.

As shown in FIG. 6, the pawl 215, in the table position, takes a locking position again which, with reference to the frame bearing sheet 205, is identical to the locking position shown in FIG. 5 for the use position, the pawl 215 therefore having identical functions. In particular, the pawl 215 is again secured by means of the clamping cam 223 and the catching element 225 as securing elements. In this respect, the exemplary embodiments are completely identical. The geometry chosen, i.e. the dimensions and radii of the second hooked mouth 231 and the distances to the pivoting axles, ensure that the pawl 215 is not opened, in the pivoted position, by a momentum of the securing elements.

The return to the use position is initiated again by activating the activation lever 228 which unlocks the adjuster 201 in the manner previously described. When pivoting the adjuster 201 from the position in FIG. 6 to the position in FIG. 5, first the pawl 215, released from the safety elements 223 and 225, is opened via the second locking bolt 232, and then the second locking bolt 232 is released from the pawl 215. As soon as the first locking bolt 218 comes to bear against a protruding rim area of the first mouth 217, it presses the pawl 215 in a clockwise direction with reference to the figure, so that the pawl, once the use position has been reached, resumes its locking position again in which the first hooked mouth 217 clutches the locking bolt 218, and in which the pawl 215 is secured by the securing elements 223 and 225.

That which is claimed:

1. An adjuster for a vehicle seat, the adjuster comprising:
   a first adjuster part and a second adjuster part that are mounted for there being relative pivoting therebetween, by way of which at least part of the vehicle seat can be pivoted at least between a first position and a second position; and
   a pawl that is pivotably borne on the first adjuster part and includes at least:
      a first mouth that releasably cooperates with a first locking element of the second adjuster part so that the pawl locks the adjuster in the first position, and
      a second mouth that releasably cooperates with a second locking element of the second adjuster part so that the pawl locks the adjuster in the second position,
   wherein the first mouth and the second mouth are open in the same direction with reference to pivoting movement of the pawl,
   wherein, with reference to the first adjuster part,
      (a) the pawl is arranged in a locking position while the pawl locks the adjuster in the first position, and
      (b) the pawl is also arranged in said locking position while the pawl locks the adjuster in the second position, and
   wherein the adjuster further comprises securing elements for securing the pawl in said locking position while the pawl locks the adjuster in the first position, with the same securing elements securing the pawl in said locking position while the pawl locks the adjuster in the second position.

2. An adjuster according to claim 1, wherein the first position is a use position of the vehicle seat and the second position is a non-use position of the vehicle seat.

3. An adjuster according to claim 1, wherein the second locking element is separate from the first locking element.

4. An adjuster according to claim 1, wherein:
   the first and second mouths, with respect to the pivoting movement of the pawl, are respectively arranged on different sides of the pawl, and
   each of the first and second locking elements is a bolt.

5. An adjuster according to claim 1, wherein:
   the first locking element is positioned so that when the vehicle seat is transitioned to the first position, the first locking element comes into contact with the pawl and moves the pawl into a locking position so that the first mouth is in receipt of the first locking element and thereby the adjuster is locked in the first position, and
   the second locking element is positioned so that when the vehicle seat is transitioned to the second position, the second locking element comes into contact with the pawl and moves the pawl into said locking position so that the second mouth is in receipt of the second locking element and thereby the adjuster is locked in the second position.

6. An adjuster according to claim 1 in combination with the vehicle seat.

7. An adjuster according to claim 1, wherein the first and second mouths, with respect to the pivoting movement of the pawl, are respectively arranged on different sides of the pawl.

8. An adjuster according to claim 1, wherein the first and second locking elements are distant from one another and each of the first and second locking elements is a bolt.

9. An adjuster according to claim 1, wherein:
   the first adjuster part is for being connected to a seat frame of the vehicle seat, and
   the second adjuster part is for being connected to a backrest of the vehicle seat, for allowing the backrest to pivot relative to the seat frame between the first and second positions, with the backrest extending upright from the seat frame in the first position, so that a user can sit in the seat, and the second position being achieved by pivoting the backrest away from the first position by pivoting the backrest relative to the seat frame.

10. An adjuster according to claim 1, wherein the securing elements include a clamping cam and a catching element.

11. An adjuster according to claim 10, wherein the catching element:
   is positioned a small distance from the pawl prior to a crash, and
   supports the pawl in event of the crash.

12. An adjuster for a vehicle seat, the adjuster comprising:
   a first adjuster part and a second adjuster part that are mounted for there being relative pivoting therebetween, by way of which at least part of the vehicle seat can be pivoted at least between a first position and a second position;

a pawl that is pivotably borne on the first adjuster part and includes at least:
   a first mouth that releasably cooperates with a first locking element of the second adjuster part so that the pawl locks the adjuster in the first position, and
   a second mouth that releasably cooperates with a second locking element of the second adjuster part so that the pawl locks the adjuster in the second position, and an activation element for unlocking the adjuster from the first position, with the same activation element unlocking the adjuster from the second position, wherein the first mouth and the second mouth are open in the same direction with reference to pivoting movement of the pawl.

13. An adjuster according to claim 12, wherein with reference to the first adjuster part
   (a) the pawl is arranged in a locking position while the pawl locks the adjuster in the first position, and
   (b) the pawl is also arranged in said locking position while the pawl locks the adjuster in the second position, and the adjuster further comprises securing elements for securing the pawl in said locking position while the pawl locks the adjuster in the first position, with the same securing elements securing the pawl in said locking position while the pawl locks the adjuster in the second position.

14. An adjuster according to claim 13, wherein:
the first locking element is a first bolt positioned so that when the vehicle seat is transitioned to the first position, the first bolt comes into contact with the pawl and moves the pawl into said locking position so that the first mouth is in receipt of the first bolt and thereby the adjuster is locked in the first position, and
the second locking element is a second bolt positioned so that when the vehicle seat is transitioned to the second position, the second bolt comes into contact with the pawl and moves the pawl into said locking position so that the second mouth is in receipt of the second bolt and thereby the adjuster is locked in the second position.

15. An adjuster for a vehicle seat, the adjuster comprising:
a first adjuster part and a second adjuster part that are mounted for there being relative pivoting therebetween, by way of which at least part of the vehicle seat can be pivoted at least between a first position and a second position; and a pawl that is pivotably borne on the first adjuster part and includes at least:
   a first mouth that releasably cooperates with a first locking element of the second adjuster part so that the pawl locks the adjuster in the first position, and
   a second mouth that releasably cooperates with a second locking element of the second adjuster part so that the pawl locks the adjuster in the second position, wherein:
the first mouth and the second mouth are open in the same direction with reference to pivoting movement of the pawl,
the adjuster has four pivotable joints by way of which there can be the relative pivoting between the first and second adjuster parts and the vehicle seat can be pivoted from the first position, in which the vehicle seat is for being sat on, to the second position, which is a flat floor position,
the first adjuster part is a first leg which is upright while the vehicle seat is in the first position, and
the second adjuster part is connected between the first leg and a second leg of the adjuster, with the second leg being upright while the vehicle seat is in the first position.

16. An adjuster according to claim 15, wherein the adjuster includes a link which is pivotably connected to the second leg at one of the pivotable joints, the second adjuster part is fixedly attached to the link, and the second adjuster part is pivotably connected to the first leg at another of the pivotable joints.

17. An adjuster according to claim 15, wherein
   with reference to the first adjuster part:
      the pawl is arranged in a locking position while the pawl locks the adjuster in the first position, and
      the pawl is also arranged in said locking position while the pawl locks the adjuster in the second position, and
   the adjuster further comprises:
      securing elements for securing the pawl in said locking position while the pawl locks the adjuster in the first position, with the same securing elements securing the pawl in said locking position while the pawl locks the adjuster in the second position; and
      an activation element for unlocking the adjuster from the first position, with the same activation element unlocking the adjuster from the second position.

18. An adjuster for a vehicle seat, the adjuster comprising:
a first adjuster part and a second adjuster part that are mounted for there being relative pivoting therebetween, by way of which at least part of the vehicle seat can be pivoted at least between a first position and a second position, with the relative pivoting at least including pivoting of the second adjuster part relative to the first adjuster part; and a pawl that is pivotably borne on the first adjuster part and releasably cooperates with:
   a first bolt of the second adjuster part to lock the adjuster in the first position, with the locking in the first position being at least partially responsive to pivoting of the second adjuster part, and
   a second bolt of the second adjuster part to lock the adjuster in the second position, with the locking in the second position being at least partially responsive to pivoting of the second adjuster part, wherein, with reference to the first adjuster part
   (a) the pawl is arranged in a locking position while the pawl locks the adjuster in the first position, and
   (b) the pawl is also arranged in said locking position while the pawl locks the adjuster in the second position, and wherein the adjuster further comprises:
   securing elements for securing the pawl in said locking position while the pawl locks the adjuster in the first position, with the same securing elements securing the pawl in said locking position while the pawl locks the adjuster in the second position; and
   an activation element for unlocking the adjuster from the first position, with the same activation element unlocking the adjuster from the second position.

19. An adjuster according to claim 18, wherein:

a first mouth of the pawl receives the first bolt to lock the adjuster in the first position, and a second mouth of the pawl receives the second bolt to lock the adjuster in the second position.

20. An adjuster according to claim 19, wherein:

the first bolt is positioned so that when the vehicle seat is transitioned to the first position, the first bolt comes into contact with the pawl and moves the pawl into said locking position so that the first mouth is in receipt of first bolt and thereby the adjuster is locked in the first position, and the second bolt is positioned so that when the vehicle seat is transitioned to the second position, the second bolt comes into contact with the pawl and moves the pawl into said locking position so that the second mouth is in receipt of the second bolt and thereby the adjuster is locked in the second position.

21. An adjuster for a vehicle seat, the adjuster comprising:

a first adjuster part and a second adjuster part that are mounted for there being relative pivoting therebetween, by way of which at least part of the vehicle seat can be pivoted at least between a first position and a second position; and a pawl that is pivotably borne on the first adjuster part and includes at least:
- a first mouth that releasably cooperates with a first locking element of the second adjuster part so that the pawl locks the adjuster in the first position, and
- a second mouth that releasably cooperates with a second locking element of the second adjuster part so that the pawl locks the adjuster in the second position, wherein the first mouth and the second mouth are open in the same direction with reference to pivoting movement of the pawl, wherein the first position is a use position of the vehicle seat and the second position is a non-use position of the vehicle seat, wherein securing elements, which are for securing the pawl in a locking position, include a clamping cam and a catching element, and wherein the clamping cam is spring loaded and bears against the pawl to secure the pawl in said locking position.

22. An adjuster according to claim 21, wherein the catching element:

is positioned a small distance from the pawl prior to a crash, and supports the pawl in event of the crash.

23. An adjuster according to claim 22, wherein:

the pawl is arranged in said locking position while the pawl locks the adjuster in the first position, the pawl is also arranged in said locking position while the pawl locks the adjuster in the second position, the securing elements are for securing the pawl in said locking position while the pawl locks the adjuster in the first position, and the securing elements are for securing the pawl in said locking position while the pawl locks the adjuster in the second position.

24. An adjuster according to claim 21, wherein:

the pawl is arranged in said locking position while the pawl locks the adjuster in the first position, the pawl is also arranged in said locking position while the pawl locks the adjuster in the second position, the securing elements are for securing the pawl in said locking position while the pawl locks the adjuster in the first position, and the securing elements are for securing the pawl in said locking position while the pawl locks the adjuster in the second position.

* * * * *